United States Patent
Dalsgaard et al.

(10) Patent No.: US 9,839,051 B2
(45) Date of Patent: Dec. 5, 2017

(54) SELECTING AN ACCESS METHOD WHILE PERFORMING HANDOVERS IN A MOBILE COMMUNICATION SYSTEM

(75) Inventors: Lars Dalsgaard, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 1082 days.

(21) Appl. No.: 12/444,378

(22) PCT Filed: Oct. 1, 2007

(86) PCT No.: PCT/IB2007/002970
§ 371 (c)(1),
(2), (4) Date: Apr. 5, 2010

(87) PCT Pub. No.: WO2008/041115
PCT Pub. Date: Apr. 10, 2008

(65) Prior Publication Data
US 2010/0317344 A1    Dec. 16, 2010

(30) Foreign Application Priority Data
Oct. 4, 2006 (GB) .................................. 0619620.8

(51) Int. Cl.
*H04W 74/02* (2009.01)
*H04W 36/08* (2009.01)

(52) U.S. Cl.
CPC ............ *H04W 74/02* (2013.01); *H04W 36/08* (2013.01)

(58) Field of Classification Search
CPC ............ H04W 36/00; H04W 36/0005; H04W 36/0022; H04W 74/0833; H04W 74/0866
USPC .................................................. 455/436–444
See application file for complete search history.

(56) References Cited

U.S. PATENT DOCUMENTS

| | | | |
|---|---|---|---|
| 8,064,401 B2 * | 11/2011 | Anigstein et al. ............ | 370/331 |
| 2004/0077348 A1 * | 4/2004 | Sebire et al. ................. | 455/436 |
| 2005/0025176 A1 * | 2/2005 | Ko et al. ....................... | 370/448 |
| 2005/0288019 A1 * | 12/2005 | Park et al. .................... | 455/436 |
| 2006/0270411 A1 * | 11/2006 | Grayson ....................... | 455/444 |
| 2007/0149206 A1 * | 6/2007 | Wang et al. .................. | 455/450 |

FOREIGN PATENT DOCUMENTS

| | | |
|---|---|---|
| WO | 99/01002 | 1/1999 |
| WO | 2000/074420 A1 | 12/2000 |
| WO | 2007/075559 A2 | 7/2007 |

OTHER PUBLICATIONS

Office Action from corresponding Chinese Application No. 200780043132.0, dated Aug. 11, 2010, 6 pages.
International Search Report and Written Opinion received for corresponding Patent Cooperation Treaty Application No. PCT/IB2007/002970, dated Feb. 11, 2008, 15 pages.
(Continued)

*Primary Examiner* — Marisol Figueroa
(74) *Attorney, Agent, or Firm* — Harrington & Smith

(57) ABSTRACT

A method of managing a handover of a connection of a mobile device between a first access node and a second access node in a communications system, the method comprising: sending information from the communications system to the mobile device; selecting one of a plurality of access methods for accessing the second access node based on said information; and accessing the second access node using the selected access method.

22 Claims, 2 Drawing Sheets

(56) References Cited

OTHER PUBLICATIONS

International Preliminary Report on Patentability received for corresponding Patent Cooperation Treaty Application No. PCT/IB2007/002970, dated Apr. 16, 2009, 9 pages.
"3rd Generation Partnership Project, Technical Specification Group Radio Access Network, Feasibility Study for Evolved UTRA and UTRAN", Release 7, Technical Report, 3GPP TR 25.912, V0.2.0, Jun. 2006, pp. 1-57.
"3rd Generation Partnership Project, Technical Specification Group Radio Access Network, Evolved Universal Terrestrial Radio Access (E-UTRA) and Evolved Universal Terrestrial Radio Access Network (E-UTRAN), Radio interface protocol aspects", Release 7, Technical Report, 3GPP TR 25.813, V7.0.0, Jun. 2006, pp. 1-39.
Office Action from corresponding Chinese Patent Application No. 200780043132.0, dated Aug. 11, 2010, 6 pages.

* cited by examiner

SELECTING AN ACCESS METHOD WHILE PERFORMING HANDOVERS IN A MOBILE COMMUNICATION SYSTEM

RELATED APPLICATION

This application was originally filed as PCT Application No. PCT/IB2007/002970 filed Oct. 1, 2007, which claims the priority of U.K. Patent Application 0619620.8 filed Oct. 4, 2006.

FIELD OF THE INVENTION

The present invention relates to a communication system, and in particular to handover of a mobile device between at least two access nodes.

BACKGROUND

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment (UE), is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. When a mobile device moves from a base station to another base station, handover (HO) techniques are used to ensure that the communication is not lost as a consequence of the move. There are many different techniques for processing signals for transmission between the base station and the user equipment, and the precise handover technique which is used depends on the access system.

Typically the operation of a base station apparatus and other apparatus of an access system required for the communication is controlled by a particular control entity. The control entity is typically interconnected with other control entities of the particular communication network. Handover management is typically provided by an appropriate handover control entity of the cellular communication system. The handover controller typically provides a centralised control of handovers in a radio access network so as to appropriately control the handover in different cells of the access network. For example, a radio network controller (RNC) centrally manages handovers in Universal Terrestrial Radio Access Networks (UTRAN) and a base station controller (BSC) manages the handovers in GSM (Global System for Mobile) EDGE (Enhanced Data for GSM Evolution) Radio Access Networks (GERAN).

Further to the above, it has been proposed that various control functions that have been typically handled by a centralised controller can also be handled in a distributed manner. This kind of distributed architecture is sometimes referred to as a "flat architecture". In view of handover management this means that there is no central node in a radio access network, but the handover control is distributed to be taken care of by a base station and associated local control functions thereof.

A non-limiting example of such architectures is a concept known as the Evolved Universal Terrestrial Radio Access (E-UTRA) also known as long term evolution (LTE). An Evolved Universal Terrestrial Radio Access Network (E-UTRAN) consists of E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices. The eNBs interface to an E-UTRAN access gateway (aGW) via a so called S1 interface, and are inter-connected via a so called X2 interface.

There is always a need to improve the performance of communications systems and it is an aim of the present invention to provide a new way of achieving this.

SUMMARY

In the current LTE specification work there has been and still is an ongoing discussion concerning the access procedure to be used in the target cell during handover execution. There are two options currently being discussed:

1) One option is to have an access procedure in the target cell based on the standard contention based RACH (Random Access Channel).

2) The other option is based on the approach used in GSM using non-contention based UL-SCH (Uplink Shared Channel) allocated to a handover for transmitting access bursts.

One of the targets of both access procedures is for allowing the network to estimate the timing advance (TA) to be used for the user equipment in uplink transmission In GSM, the target cell allocates resources for the UE to be used by the UE for transmitting access bursts in the cell. In GSM, there is only one option for accessing the new cell in case of a handover—dedicated uplink resource reserved for the UE to send uplink access bursts in the new cell.

The present inventors have realized that rather than choose one of the two access procedures discussed above for implementation as the standard in LTE architectures, it would be advantageous to allow the network to indicate which of the two access procedures to be used during handover execution. This possibility can be reached by allowing for the network to indicate to the UE which access procedure the UE should apply in the target cell. The access method to be used in the target cell may be signalled to the UE in the handover command, and could, in its simplest form, consist of 1 bit.

The present inventors have further realized that the inventive concept underlying the idea discussed above is not limited to the aforementioned access methods and network architecture and may be applied more generally using different access methods and architectures.

In light of the above, in accordance with an embodiment there is provided a method of managing a handover of a connection of a mobile device between a first access node and a second access node in a communications system, the method comprising: sending information from the communications system to the mobile device; selecting one of a plurality of access methods for accessing the second access node based on said information; and accessing the second access node using the selected access method.

Embodiments allow for greater flexibility of functionality within a communications system and more efficient use of resources. In different circumstances different access methods will be more appropriate. For example, it may be important for some applications to use a handover method which minimizes delay and has a high success rate. For other applications, factors such as delay may not be so important and instead simplicity may be the key feature in order to make the most efficient use of the communication systems resources. Embodiments allow for different access methods to be used in a handover based on information sent from the access node to which the mobile device is attached, and a selection may be made according to which of the access methods is most appropriate for a given application. This arrangement provides a communications system which is more flexible and makes better use of its resources.

According to one arrangement, the information sent from the first access node to the mobile device comprises an indicator specifying which access method the mobile device should use for accessing the second access node. The indicator may be sent from the first access node to the mobile device in a handover command message. The indicator could be, for example, a single bit indicating two different access methods according to the state of the bit. For example, the signalled bit could be interpreted as:

0->Use random access bursts on normal contention based RACH

1->Use access burst on reserved UL-SCH resource.

Another way to indicate to the UE which access procedure to apply in the target access node in connection with the handover would be to signal the needed information in System Information (SI).

In one embodiment, there is no need to signal any direct information to UE concerning which access method to apply. Which access method to apply could be defined in such a way that if the information sent from the first access node to the mobile device includes resource allocation for a particular signalling type in the target access node, the mobile device selects a method for accessing the target access node which uses said signalling type. For example, if the handover command includes resource allocation for UL-SCH in the target cell, the UE can use this allocation for access burst transmission. Otherwise the UE could use contention based RACH for access burst transmission.

Concerning the actual usage of each access procedure, and when to apply which access procedure, this could also depend on the actual data transmission in progress and the overall quality of service (QoS) requirements/parameters for a connection. Requirements such as low jitter, short delay, etc. could indicate that an access method with emphasis in fast and non-contention based access should be used. If on the other hand there are no strict requirements on the data transmission in terms of delay, cell switching time, etc. a contention access method could be used.

Another parameter that could be used for determining what access procedure to be used in connection with handover is the DRX (discontinuous reception) interval applied in the active state. The DRX interval to be applied in the active state is commanded by the network and will depend heavily on the requirements (e.g. QoS) of the current ongoing data transmission. Therefore the DRX interval could be used as an indicator for which access method to use in a new cell when handover occurs. The limits or detailed information about which DRX intervals triggers which access method could be system parameters stated either in specification or broadcasted as a system parameter in the network (using, for example, system information broadcasting).

The method for accessing the target access node during handover may be selected based on a combination of factors including, for example, an indicator, signalling allocation type, quality of service, and or DRX interval.

As for the use of a basic RACH procedure for accessing a target cell during handover, this may seem to be an easy and straight forward choice. However, the approach has drawbacks linked to the fact that the RACH is a contention based channel. This means that there will be higher uncertainties concerning the predictability of delay and success rate. However, in LTE for example, delay may not always be the most important factor in every given handover situation (e.g. in a normal web browsing example). In these situations simplicity might be preferable.

The possibility of using access burst sending on dedicated UL-SCH resource has several options on how to actually allocate the UL-SCH resource. The assignment of dedicated UL-SCH resource in the target cell can be done in at least three ways:

1) Give resource block allocation in HO command (direct to UL-SCH).

2) Do not give the resource block in HO command but location of resource allocation message (in the target cell) for UL-SCH is given.

3) No information concerning UL-SCH resource is given in HO command. UE UL-SCH is allocated through AT (Allocation Table) in the target cell which the UE will receive in the target cell by itself (UE could be in non-DRX).

It should be noted that the options above are preferably supporting timed HO procedure, but this is no limiting factor. They can work also as non-timed HO although not so efficient.

It can be argued that using the access burst sending on dedicated UL-SCH resource in the target cell is slightly more complicated than the alternative of just using the normal RACH procedure. The UL-SCH procedure though has a few advantages as compared to RACH:

1) Access bursts are sent on non-contention based UL-SCH (UE dedicated UL-SCH resource). This eliminates the collision risk present in contention access method.

2) Delay is more predictable.

3) Applying switching time synchronisation between source and target cell can potentially reduce the cell switching to become very short (compared with non-timed switching and contention based access approach).

4) Success rate is higher (using non-contention based access) as the collision risk from contention based access is removed.

5) Load on the contention based access channel (RACH) is reduced.

An advantage of embodiments is to allow a network to force UEs doing different types of handover (intra/inter-frequency) to use different methods of acquiring timing advance. For example, UEs performing a handover to an inter-frequency cell could use a contention based access approach such as RACH, while UEs performing an intra-frequency layer handover could use a non-contention based access approach such as UL-SCH.

According to another embodiment there is provided an access node for use in communications system, the access node being adapted to send information to a mobile device indicating which one of a plurality of access methods is to be used for accessing a target access node during handover of the mobile device from the access node to the target access node.

According to another embodiment there is provided a mobile user equipment adapted to receive information from an access node, select one of a plurality of access methods for accessing a target access node during handover based on said information, and access the target access node using the selected access method.

According to another embodiment there is provided a communications network comprising a first access node, a second access node, and a mobile device, the communications network being adapted to send information to the mobile device, the mobile device being adapted to receive said information, select one of a plurality of access methods for accessing the second access node during handover of the mobile device from the first access node to the second access node based on said information, and access the second access node using the selected access method.

According to another embodiment there is provided computer program comprising program code means adapted to perform the method described herein when the program is run on a computer or on a processor.

According to another embodiment there is provided a computer program product comprising program code means stored in a computer readable medium, the program code means being adapted to perform the method described herein when the program is run on a computer or on a processor.

BRIEF DESCRIPTION OF THE FIGURES

For a better understanding of the embodiments and how the same may be carried into effect, reference will now be made by way of example only to the accompanying drawings in which.

DESCRIPTION OF EXEMPLIFYING EMBODIMENTS

Figure 1:
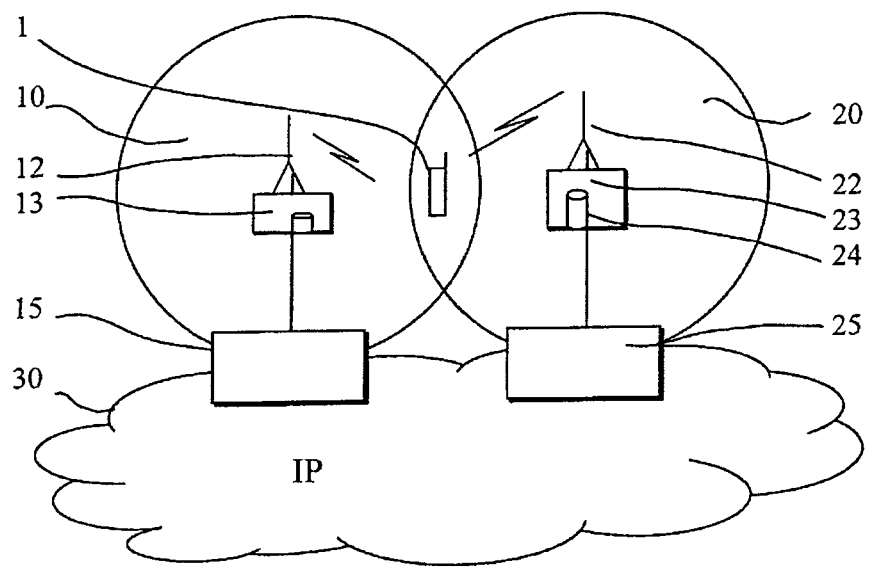
FIG. 1 shows a schematic presentation of two wireless access systems a mobile device may use for accessing a data network.

Before explaining in detail certain exemplifying embodiments, certain general principles of wirelessly accessing a communication system are briefly explained with reference to FIGS. 1 and 2.

A communication device can be used for accessing various services and/or applications provided via a communications system. In wireless or mobile systems the access is provided via an access interface between a mobile device 1 and an appropriate wireless access system 10 and 20.

A mobile device 1 can typically access wirelessly a communication system via at least one base station 12 and 22 or similar wireless transmitter and/or receiver node. Non-limiting examples of appropriate access nodes are a base station of a cellular system and a base station of a wireless local area network (WLAN). Each mobile device may have one or more radio channels open at the same time and may be connected to more than one base station.

A base station is typically controlled by at least one appropriate controller entity 13, 23 so as to enable operation thereof and management of mobile devices in communication with the base station. The controller entity is typically provided with memory capacity and at least one data processor.

A mobile device may be used for accessing various applications. For example, a mobile device may access applications provided in a data network 30. For example, various applications may be offered in a data network that is based on the Internet Protocol (IP) or any other appropriate protocol.

In FIG. 1 the base station nodes 12 and 22 are connected to the data network 30 via appropriate gateways 15 and 25 respectively. A gateway function between a base station node and another network may be provided by means of any appropriate gateway node, for example a packet data gateway and/or an access gateway.

Figure 2:
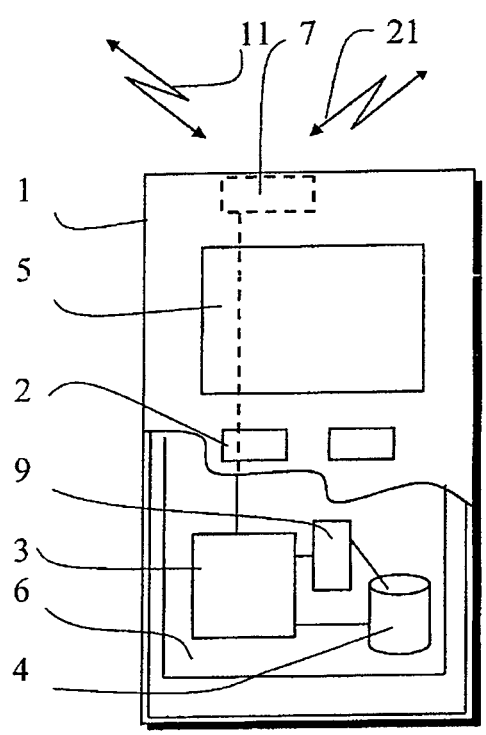
FIG. 2 shows a partially sectioned view of a mobile device.

FIG. 2 shows a schematic partially sectioned view of a mobile device 1 that can be used for accessing a communication system via a wireless interface. The mobile device 1 of FIG. 1 can be used for various tasks such as making and receiving phone calls, for receiving and sending data from and to a data network and for experiencing, for example, multimedia or other content.

An appropriate device may be provided by any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The mobile device 1 may communicate via an appropriate radio interface arrangement of the mobile device. In FIG. 1 the radio interface arrangement is designated schematically by block 7. The interface arrangement may be provided for example by means of a radio part and associated antenna arrangement. The antenna arrangement may be arranged internally or externally to the mobile device.

A mobile device is typically provided with at least one data processing entity 3 and at least one memory 4 for use in tasks it is designed to perform. The data processing and storage entities can be provided on an appropriate circuit board and/or in chipsets. This feature is denoted by reference 6.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

The mobile device 1 may be enabled to communicate with a number of access nodes, for example when it is located in the coverage areas of the two base stations 12 and 22 of FIG. 1. This capability is illustrated in FIG. 2 by the two wireless interfaces 11 and 21.

The mobile device 1 can be handed over from one access node such as a base station to another access node. In accordance with an embodiment of the present invention information sent from the source base station to the mobile device comprises an indicator specifying which access method the mobile device should use for accessing the target base station. The indicator may be sent from the source base station to the mobile device in a handover command message. The indicator could be, for example, a single bit indicating two different access methods according to the state of the bit. For example, the signalled bit could be interpreted as:

0->Use random access bursts on normal contention based RACH

1->Use access burst on reserved UL-SCH resource.

Figure 3:
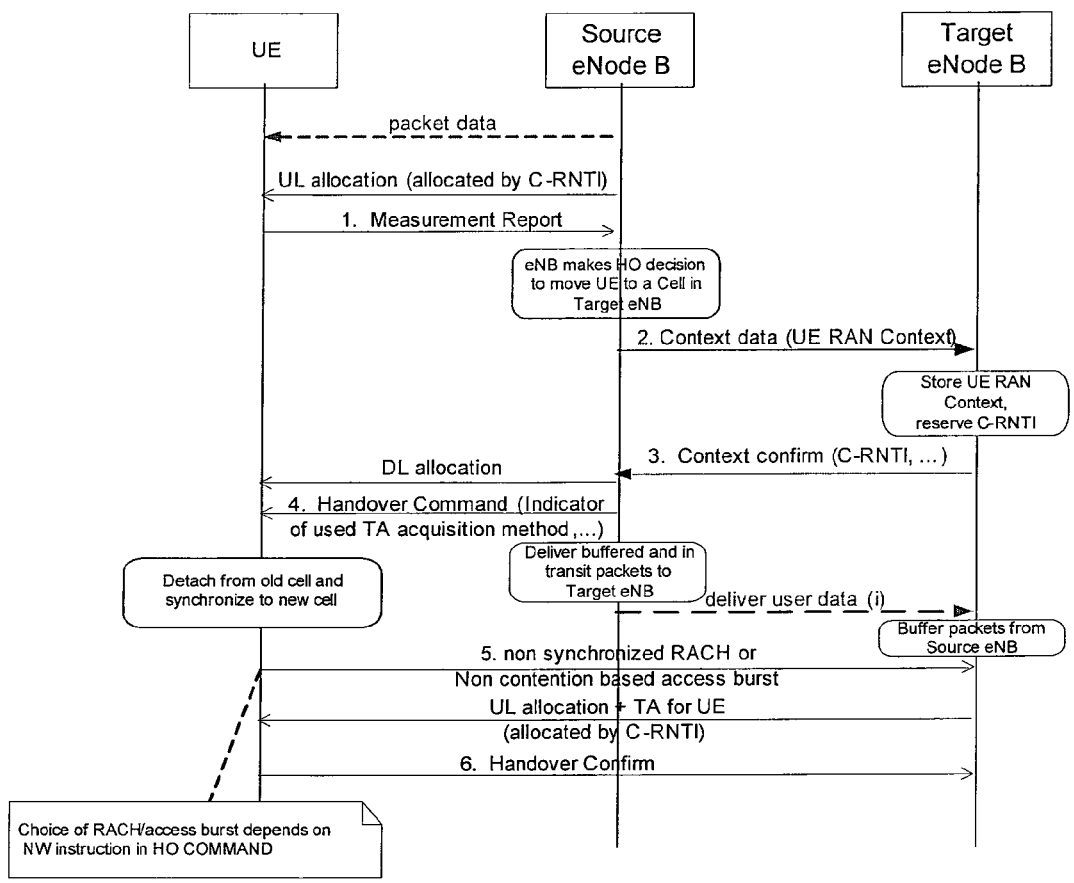
FIG. 3 shows a signalling flow chart in accordance with a specific embodiment of the present invention.

This approach is illustrated in FIG. 3 which illustrates one possible handover scenario for LTE. Here the inclusion of the proposed bit is illustrated in Step 4 of the signalling diagram (message sequencing chart—MSC).

The above method can be embodied in any access system providing wireless access by means of a wireless transceiver node and where mobility history information may be needed for some reason. For example, the access system architecture may be based on that known from the E-UTRA and based on use of the E-UTRAN Node Bs (eNBs). Therefore specific examples for possible signalling mechanisms for enabling passing of information about handover or other mobility related events of a mobile device between access nodes are now described in more detail with reference to the E-UTRA and to the signalling flow chart of FIG. 3.

To assist in understanding the below described embodiments, a brief description of some of the messages associated with a handover in accordance with the E-UTRA is given first. More particularly, the exemplifying handover signalling sequence of FIG. 3 is based on the handover procedure as shown in Figure 9.1.5 of the third generation partnership project (3GPP) TR 25.813, V7.0.0(2006-06) 'Evolved UTRA and UTRAN—Radio interface protocol aspects'. It is noted that not all of the shown messages may be needed for carrying any information that directly associated with the embodiments.

As shown, a mobile device (UE) may send measurement reports 1 to a serving base station, referred to as Source eNB (E-UTRAN Node B) in FIG. 3. The serving base station may then make a decision based on a measurement report and other information, for example radio resource management information, to hand off the mobile device to another i.e. target base station (Target eNB in FIG. 3). The base station prepares the target base station for handover by sending a request for handover, see message 2. The message may contain information relevant to the proposed handover. This data may then be stored, at least temporarily, in the target base station. Alternatively, the data is used immediately.

The target base station may now start preparing for the handover and respond to source base station providing any required parameters in message 3. After reception of an acceptance of the handover from the target base station, the source base station may start forwarding data packets to the target base station.

A downlink (DL) may be allocated and the mobile device may also be sent a handover command message 4. In accordance with embodiments of the present invention, the handover command message includes information which can be used by the UE in order to select a suitable access method to the target base station. The mobile device may then initiate an appropriate access process to the target base station by sending message 5. The target base station may respond with message including parameters such as uplink allocation and timing advance. These are then used by the mobile device to send a handover confirm message 6 to the target base station. This message typically completes the handover procedure for the mobile device.

The target base station may then inform the source base station of a successful handover. Location information of the mobile device may be updated by message from the target base station to a mobility management entity (MME/UPE) in order to enable forwarding of data packets directly to the new i.e. target base station.

The required data processing functions may be provided by means of one or more data processors. All data processing may be provided in a central processing unit of an access system, or distributed across several data processing modules. For example, the access nodes may be adapted to send information which may be used by a mobile device to select which access method to use for accessing a target access node in a handover. The mobile device may be adapted to process said information and select a suitable access method based on the received information. The data processing functions of a mobile device may be provided by separate processors, see for example entities 3 and 9 of FIG. 2, or by an integrated processor. An appropriately adapted computer program code product or products may be used for implementing the embodiments, when loaded on an appropriate processor, for example in a processor of the mobile device and/or an access system controller. The program code means may, for example, determine the suitability of an access procedure, selection, generation of messages and/or information elements, interpretation of information and so forth. The program code product for providing the operation may be stored on and provided by means of a carrier medium such as a carrier disc, card or tape. A possibility is to download the program code product to a base station and/or mobile device via a data network.

It is noted that whilst embodiments have been described in relation to mobile devices such as mobile terminals, embodiments of the present invention are applicable to any other suitable type of apparatus suitable for communication via a multiple of access nodes wherein a communication device can be handed over from a communication interface to another communication interface. The wireless interfaces may even be based on different access technologies. A mobile device may be configured to enable use of different access technologies, for example, based on an appropriate multi-radio implementation.

It is also noted that although certain embodiments were described above by way of example with reference to the exemplifying architectures of certain cellular networks and a wireless local area network, embodiments may be applied to any other suitable forms of communication systems than those illustrated and described herein. It is also noted that the term access interface is understood to refer to any interface an apparatus configured for wireless communication may use for accessing applications.

It is also noted herein that while the above describes exemplifying embodiments of the invention, there are several variations and modifications which may be made to the disclosed solution without departing from the scope of the present invention as defined in the appended claims.

The invention claimed is:

1. An apparatus comprising:
    at least one data processor; and
    at least one memory including computer program code, where the at least one memory and computer program code are configured, with the at least one data processor, to cause the apparatus at least to:
        receive information from a source access node of a communications system;
        select one of a plurality of access methods for accessing a target access node during handover based on the information, where the source access node and the target access node are two access nodes of the communication system; and
        access the target access node using the selected access method, where the information comprises an indicator specifying which access method of the plurality of access methods the apparatus should use for accessing the target access node during handover to the target access node, where
        the apparatus receives the information, selects one of the plurality of access methods and accesses the target access node prior to receiving any timing advance parameter for the target access node, and where the method for accessing the target access node is selected based on a discontinuous reception interval of a connection.

2. An apparatus as in claim 1 wherein the apparatus is configured to receive the information from the source access node in a handover command message.

3. An apparatus as in claim 1 wherein the apparatus is configured to receive the information in System Information (SI).

4. An apparatus as in claim 1 wherein the information includes resource allocation for a particular signaling type in the target access node, and the apparatus is configured to select a method for accessing the target access node based on said signaling type.

5. An apparatus as in claim 1 wherein the apparatus is configured to select the method for accessing the target access node based on a quality of service parameter for a connection.

6. An apparatus as in claim 1 where the plurality of access methods comprise at least one method which uses a contention based channel and at least one method which uses a non-contention based channel.

7. A method comprising:
    receiving information from a communications system at a mobile device, wherein the communication system comprises at least a first access node and a second access node;
    selecting one of a plurality of access methods for accessing the second access node based on said information; and
    accessing the second access node using the selected access method; where
    the plurality of access methods comprise at least one method which uses a contention based channel and at least one method which uses a non-contention based channel; and where
    handover to an inter-frequency cell uses the contention based channel for accessing the second access node, and where handover to an intra-frequency cell use the non-contention based channel for accessing the second access node.

8. A method comprising:
    determining information indicating which one of a plurality of access methods is to be used for accessing a target access node during handover of a mobile device from a source access node to the target access node, where the source access node and the target access node are two access nodes of a communication system, and where the information comprises an indicator specifying which access method of the plurality of access methods the mobile device should use for accessing the target access node during handover to the target access node; and
    sending the information to the mobile device, where the information enables the mobile device to access the target access node prior to receiving any timing advance parameter for the target access node, and where the indicator is a single bit indicating one of two different access methods according to a state of the bit.

9. A method comprising:
    determining information indicating which one of a plurality of access methods is to be used for accessing a target access node during handover of a mobile device from a source access node to the target access node, where the source access node and the target access node are two access nodes of a communication system, and where the information comprises an indicator specifying which access method of the plurality of access methods the mobile device should use for accessing the target access node during handover to the target access node; and
    sending the information to the mobile device, where the information enables the mobile device to access the target access node prior to receiving any timing advance parameter for the target access node, and where handover to an inter-frequency cell uses a contention based channel for accessing the second access node whereas handover to an intra-frequency cell use a non-contention based channel for accessing the second access node.

10. An apparatus comprising:
    at least one data processor; and
    at least one non-transitory memory including computer program code, where the at least one memory and computer program code are configured, with the at least one data processor, to cause the apparatus at least to:
        receive information from a source access node of a communications system;
        select one of a plurality of access methods for accessing a target access node during handover based on the information, where the source access node and the target access node are two access nodes of the communication system; and
        access the target access node using the selected access method, where the information comprises an indicator specifying which access method of the plurality of access methods the apparatus should use for accessing the target access node during handover to the target access node, where the apparatus receives the information, selects one of the plurality of access methods and accesses the target access node prior to receiving any timing advance parameter for the target access node, and where the indicator is a single bit indicating one of two different access methods according to a state of the bit.

11. An apparatus as in claim 10, wherein the apparatus is configured to receive the information from the source access node in a handover command message .

12. An apparatus as in claim 10, wherein the apparatus is configured to receive the information in System Information (SI).

13. An apparatus as in claim 10, wherein the information includes resource allocation for a particular signaling type in the target access node, and the apparatus is configured to select a method for accessing the target access node based on said signaling type.

14. An apparatus as in claim 10, wherein the method for accessing the target access node is selected based on a quality of service parameter for a connection .

15. An apparatus as in claim 10, where the plurality of access methods comprise at least one method which uses a contention based channel and at least one method which uses a non-contention based channel.

16. An apparatus comprising:
- at least one data processor; and
- at least one non-transitory memory including computer program code, where the at least one memory and computer program code are configured, with the at least one data processor, to cause the apparatus at least to:
  - receive information from a source access node of a communications system;
  - select one of a plurality of access methods for accessing a target access node during handover based on the information, where the source access node and the target access node are two access nodes of the communication system; and
  - access the target access node using the selected access method, where the information comprises an indicator specifying which access method of the plurality of access methods the apparatus should use for accessing the target access node during handover to the target access node, where the plurality of access methods comprise at least one method which uses a contention based channel and at least one method which uses a non-contention based channel, where the apparatus receives the information, selects one of the plurality of access methods and accesses the target access node prior to receiving any timing advance parameter for the target access node, and where handover to an inter-frequency cell uses the contention based channel for accessing the second access node whereas handover to an intra-frequency cell use the non-contention based channel for accessing the second access node.

17. An apparatus as in claim 16, wherein the contention based channel is a random access channel.

18. An apparatus as in claim 16, wherein the non-contention based channel is a dedicated uplink shared channel.

19. An apparatus as in claim 16, wherein the apparatus is configured to receive the information from the source access node in a handover command message.

20. An apparatus as in claim 16, wherein the apparatus is configured to receive the information in System Information (SI).

21. An apparatus as in claim 16, wherein the information includes resource allocation for a particular signaling type in the target access node, and the apparatus is configured to select a method for accessing the target access node based on said signaling type .

22. An apparatus as in claim 16, wherein the apparatus is configured to select the method for accessing the target access node based on a quality of service parameter for a connection .

* * * * *